(12) United States Patent
Wang et al.

(10) Patent No.: US 9,594,838 B2
(45) Date of Patent: Mar. 14, 2017

(54) QUERY SIMPLIFICATION

(71) Applicant: MICROSOFT CORPORATION, Redmond, WA (US)

(72) Inventors: Ye-Yi Wang, Redmond, WA (US); Xiaodong He, Issaquah, WA (US); Xiaolong Li, Redmond, WA (US); Shihao Ji, Bellevue, WA (US); Bin Zhang, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 299 days.

(21) Appl. No.: 13/828,948

(22) Filed: Mar. 14, 2013

(65) Prior Publication Data

US 2014/0279995 A1     Sep. 18, 2014

(51) Int. Cl.
*G06F 7/00* (2006.01)
*G06F 17/30* (2006.01)

(52) U.S. Cl.
CPC .. *G06F 17/30864* (2013.01); *G06F 17/30663* (2013.01)

(58) Field of Classification Search
CPC ......... G06F 17/30864; G06F 17/30663; G06F 17/30873
USPC .............. 707/706, 760, 748, 750, 765
See application file for complete search history.

(56) References Cited

U.S. PATENT DOCUMENTS

| | | | |
|---|---|---|---|
| 7,406,462 B2 | 7/2008 | Carmel et al. | |
| 7,461,059 B2* | 12/2008 | Richardson et al. | |
| 7,603,348 B2 | 10/2009 | He et al. | |
| 7,865,495 B1 | 1/2011 | Roizen et al. | |
| 8,027,964 B2 | 9/2011 | Boulis | |
| 8,156,099 B2* | 4/2012 | Norris | G06F 17/3087 705/14.58 |
| 8,326,826 B1* | 12/2012 | Upstill | G06F 17/30873 707/723 |
| 8,655,862 B1* | 2/2014 | Riley | G06F 17/3097 707/707 |
| 8,762,389 B1* | 6/2014 | Popovici | G06F 17/30646 707/748 |
| 2003/0014405 A1 | 1/2003 | Shapiro et al. | |

(Continued)

OTHER PUBLICATIONS

Kumaran, et al., "Reducing Long Queries Using Query Quality Predictors", in Proceedings of the 32nd International ACM SIGIR Conference on Research and Development in Information Retrieval, Jul. 19, 2009, 8 pages.

(Continued)

*Primary Examiner* — Md. I Uddin
(74) *Attorney, Agent, or Firm* — Jessica Meyers; Tom Wong; Micky Minhas

(57) ABSTRACT

Methods, systems, and computer-readable media for query simplification are provided. A search engine executed by a server receives a query. In response, the search engine determines whether the query is a long or hard query. For long or hard queries, the search engine drops one or more terms based on search engine logs. The search engine may utilize statistical models like machine translation, condition random fields, or max entropy, to identify the terms that should be dropped. The search engine obtains search results for the simplified query and transmits the results to a user that provided the query.

20 Claims, 5 Drawing Sheets

(56) References Cited

U.S. PATENT DOCUMENTS

2005/0131893 A1* 6/2005 Von Glan .......... G06F 17/30445
2011/0258212 A1* 10/2011 Lu et al. ...................... 707/760
2012/0254218 A1 10/2012 Ali et al.

OTHER PUBLICATIONS

Balasubramanian, et al., "Exploring Reductions for Long Web Queries", In Proceedings of the 33rd International ACM SIGIR Conference on Research and Development in Information Retrieval, Jul. 19, 2010, 8 pages.

Wu, et al., "An Exploration of Query Term Deletion", Retrieved on: Mar. 7, 2013, Available at: http://ir.cis.udel.edu/ECIR11Sessions/proceedings/sir11_submission_10.pdf.

"CiteSeerxB: Linguistic features to predict query difficulty (2005)", Retrieved on Mar. 14, 2013, Available at: http://citeseerx.ist.psu.edu/viewdoc/summary;jsessionid=A021D8FFE95258E0546E8D2E176022EA?doi=10.1.1.207.2650.

"CiteSeerxB: Query-Level Learning to Rank Using Isotonic Regression", Retrieved on Mar. 14, 2013, Available at: http://130.203.133.150/viewdoc/summary;jsessionid=1CF1217D9ADA76A9070F06BD1D5C9AAC? doi=10.1.1.154.9326.

"Learning to Rank", Retrieved on Mar. 14, 2013, Available at: http://research.microsoft.com/en-us/people/hangli/acml-tutorial.pdf.

"Beyond Page Rank: Machine Learning for Static Ranking", Retrieved on Mar. 14, 2013, Available at: http://research.microsoft.com/en-us/um/people/mattri/papers/www2006/staticrank.pdf.

"Learning to Rank Using Classification and Gradient Boosting", Retrieved on Mar. 14, 2013, Available at: http://research.microsoft.com/en-us/um/people/cburges/papers/BoostTreeRank.pdf.

"CiteSeerxB: Query-Level Learning to Rank Using Isotonic Regression", Retrieved on Mar. 14, 2013, Available at: http://130.203.133.150/viewdoc/summary;jsessionid=1CF1217D9ADA76A9070F06BD1D5C9AAC?doi=10.1.1.154.9326.

"Linear Rank Regression: Robust Estimation of Regression Parameters", Retrieved on Mar. 14, 2013, Available at: http://www.math.wustl.edu/~sawyer/handouts/RankRegress.pdf.

* cited by examiner

QUERY SIMPLIFICATION

BACKGROUND

Conventional search engines permit users to locate relevant websites and other content. The search engine receives user-submitted queries and returns search results that are responsive to the query. The search engine may log the queries submitted by the users to improve user experience with the search engine. Users may formulate queries that are difficult for the search engine. The difficult queries may cause the search engine to return poor search results or to take a long time to return results.

For instance, a user may enter a query for "ACME restaurant official website." The search engine may attempt to locate search results that match this query. The conventional search engine may return documents that are not relevant to the answer for the query. The user may intend to find ACMEresaurant.com. But the search engine may provide results that include each of the terms of the query without surfacing the official website for ACME restaurant as an answer.

To prevent these types of difficult queries, a conventional search engine may provide query formulation assistance. While a user is inputting initial characters associated with a search query, the search engine may receive potential completions. The conventional search engines may generate the potential completions based on a dictionary. The dictionary may include complete words or phrases. The dictionary is accessed by the search engine during query formulation to locate the words or phrases that complete the initial characters. The dictionary may include one or more terms from the query log having prior queries.

However, users may ignore the potential completions and issue the difficult queries to the search engine. When the results returned to the user are not relevant to user's expected result, the user may issue another query. Because the user issues more than one query to the search engine, the user may form a negative opinion about the search engine's performance.

SUMMARY

Embodiments of the invention simplify long or hard queries received from a user. A search engine receives the long or hard queries and simplifies the long or hard queries based on one or more query simplification statistical models associated with the search engine. The search engine may generate several statistical models from the query log. In turn, the search engine may simplify the long or hard queries using the statistical models. In one embodiment, the statistical models are selected from at least one of: condition random fields, maximum entropy, and machine translation.

A client device may issue a long or hard query to a search engine. In turn, the search engine may apply one or more statistical models to the query. Based on the statistical models, one or more simplified queries are generated for the long or hard query. The search engine may provide search results for the one or more simplified queries. In some embodiments, the search results for the one or more simplified queries are merged and transmitted to the client device for display.

In at least one embodiment, the long or hard queries may be simplified by dropping one or more terms. The search results may be selected based on the terms that remain after dropping the terms. The search engine may rank the selected search results based on all terms in the long or hard query. The ranked search results are displayed on the client device that provides the long or hard query to the search engine.

This summary is provided to introduce a selection of concepts in a simplified form. The related concepts are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Embodiments of the invention are described in detail below with reference to the attached drawing figures, wherein.

DETAILED DESCRIPTION

Figure 1:
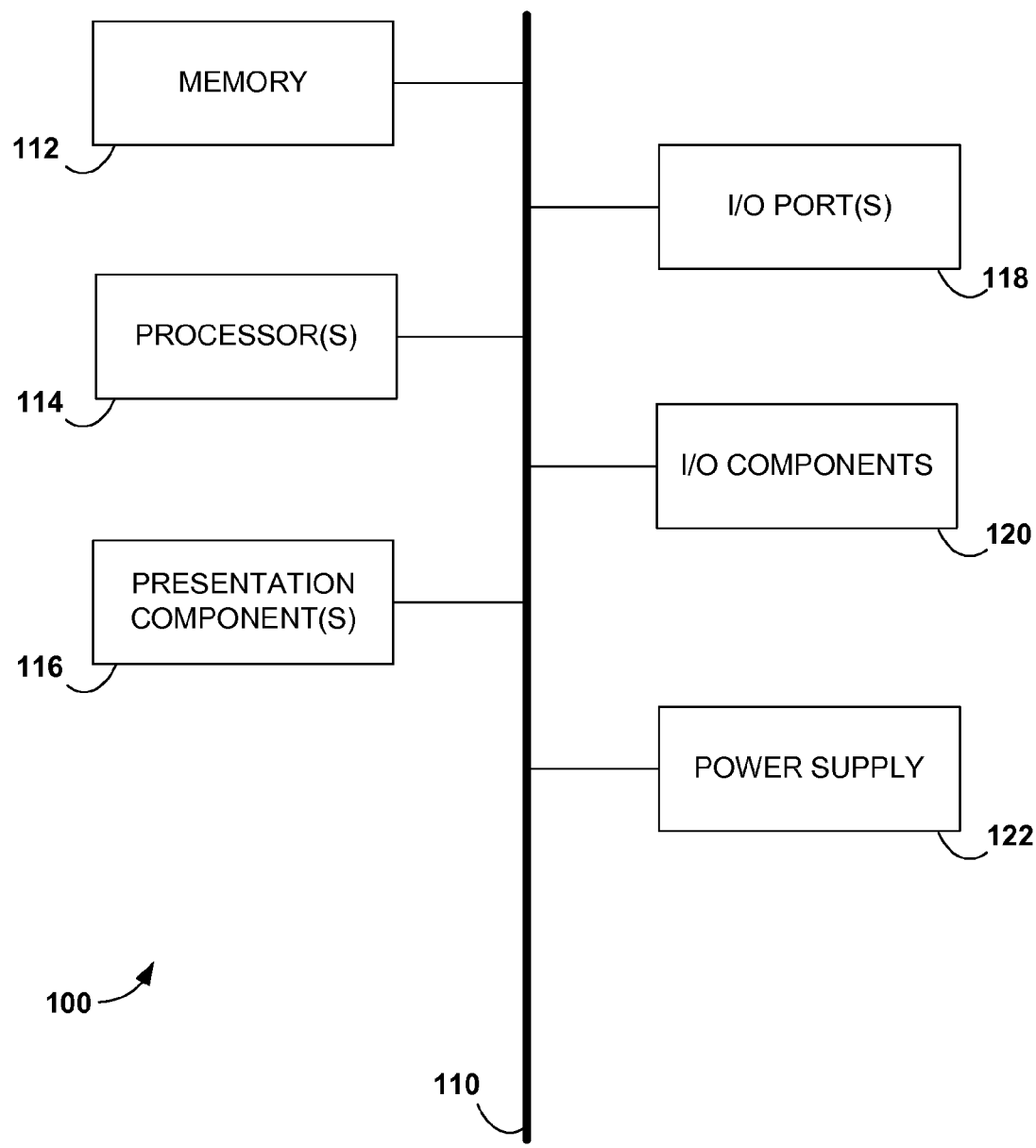
FIG. 1 is a block diagram illustrating an exemplary computing environment suitable for implementing embodiments of the invention.

The subject matter of this patent is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Although the terms "step," "block," or "component," etc., might be used herein to connote different components of methods or systems employed, the terms should not be interpreted as implying any particular order among or between various steps herein disclosed unless and except when the order of individual steps is explicitly described.

Embodiments of the invention provide relevant search results to a client device that generates a long query and transmits the long or hard query to a search engine. The long or hard query may be simplified by dropping one or more terms. The search engine selects the terms to drop based on search engine logs having, among other things, previous queries, prior search results corresponding to the queries, and user interaction data (timestamps, dwell times, click frequency, etc). The logs are used to develop one or more statistical models. In one embodiment, the search engine may select the terms that should be dropped and the terms that are kept using the statistical models. The long or hard queries are simplified at the search engine by dropping the terms based on the statistical models. The search engine processes the one or more simplified queries having less than all terms. The search results for the simplified queries are gathered, merged, and ranked by the search engine for display to the user.

In an embodiment, the search engine may filter queries to identify the long or hard queries that may require additional processing. The filter may identify a query as long as the number of terms in the query is above a predetermined number (e.g., 5). In some embodiments, the long or hard queries are filtered based on frequency or rank. The frequency filter may identify the queries as long or hard when the similar queries in the log are below a predetermined frequency (e.g., 10). Alternatively to identify the long or hard queries, the search engine may obtain a rank for uniform resource identifiers (URIs) associated with the query. When the rank is inconsistent with a regression model of the prior assigned ranks in a log having prior URIs and prior queries, the query may be identified as a long or hard query.

Accordingly, the search engine performs query simplification based on statistical models. The statistical models aid the search engine in selecting the terms that are dropped and the terms that are kept. In some embodiments, the statistical models are trained based on the logs of the search engine. The logs are mined to extract similar prior queries, prior ranks associated with the queries, or titles corresponding to the similar prior queries. The extracted information from the logs is processed by the search engine to aid in the selection of the terms for the simplified query.

Having briefly described an overview of embodiments of the invention, an exemplary operating environment suitable for use in implementing embodiments of the invention is described below.

A client device (e.g., e-book, tablet, gaming system, or hand held device) may execute one or more search applications or may access a search engine on a server to retrieve web results. In one embodiment, the client device is configured to provide search queries that may include long or hard queries. The search engine or search application may detect whether the queries are long or hard queries. When the queries are long or hard, the search engine or search application may simplify the queries, issue one or more simplified queries to an index for a repository having URIs, and merge results for the simplified queries for display on the client device. When the queries are not long or hard, the queries are processed by the search engine to obtain the search results, which are configured for display on the client device.

FIG. 1 is a block diagram illustrating an exemplary computing environment suitable for implementing embodiments of the invention. Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Nor should the computing device 100 be interpreted as having any dependency or requirement relating to any one or combination of components illustrated.

The embodiments of the invention may be described in the general context of computer code or machine-useable instructions, including computer-executable instructions such as program components being executed by a computer or other machine, such as a personal data assistant or other handheld device. Generally, program components including routines, programs, applications objects, components, data structures, and the like, refer to code that performs particular tasks or implements particular abstract data types. Embodiments of the invention may be practiced in a variety of system configurations, including handheld devices, tablet computers, consumer electronics, general-purpose computers, specialty computing devices, etc. Embodiments of the invention may also be practiced in distributed computing environments where tasks are performed by remote-processing devices that are linked through a communications network.

As one skilled in the art will appreciate, the computing device 100 may include hardware, firmware, software, or a combination of hardware and software. The hardware includes processors and memories configured to execute instructions stored in the memories. The logic associated with the instructions may be implemented, in whole or in part, directly in hardware logic. For example, and without limitation, illustrative types of hardware logic include field programmable gate array (FPGA), application specific integrated circuit (ASIC), system-on-a-chip (SOC), or complex programmable logic devices (CPLDs). The hardware logic allows a device to simplify queries provided by a user. The device is configured to generate statistical models based on search engine logs. The device may identify one or more terms of the query that should be dropped based on the statistical models. The device may, in an embodiment, drop one or more terms, receive results based on the simplified query having less than all the terms, and rank the results for display based on all the terms included in the query.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component, such as a display device, to be an I/O component. Also, processors have memory. The inventors hereof recognize that such is the nature of the art and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that is accessible by computing device 100 and includes both volatile and nonvolatile media, removable and non-removable media. Computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired data and that can be accessed by the computing device 100. In an embodiment, the computer storage media can be selected from tangible computer storage media like flash memory. These memory technologies can store data momentarily, temporarily, or permanently. Computer storage does not include and excludes communication media.

On the other hand, communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components include a microphone, joystick, game pad, satellite dish, scanner, printer, wireless device, a controller (such as a stylus, keyboard, and mouse) or a natural user interface (NUI), etc.

The NUI processes gestures (e.g., hand, face, body), voice, or other physiological inputs generated by a user. These inputs may be interpreted as queries, requests for selecting URIs, or requests for interacting with a URI included as a search result. The input of the NUI may be transmitted to the appropriate network elements for further processing. The NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Various aspects of the technology described herein are generally employed in computer systems, computer-implemented methods, and computer-readable storage media for, among other things, simplifying queries. In one embodiment, a server executes filter and query simplification components that detect queries that are candidates for simplification and that generate the simplified queries. The server may process the simplified queries generated by the system and the original query received from the user to select search results. The search results may be selected based on satisfaction metrics (e.g., dwell time, click frequency, or page visits) in a log for the search engine.

An embodiment of the invention drops terms from a query received from the user based on the search engine logs. The user enters the query via a search interface provided by the client device. The query may be identified as long or hard by a search engine based on frequency or ranks associated with prior similar queries included in the log. The search engine, which is connected to the client device over a communication network, simplifies the queries that are identified as long or hard and provides results that may be based on one or more subqueries derived from the query identified as long or hard.

Figure 2:
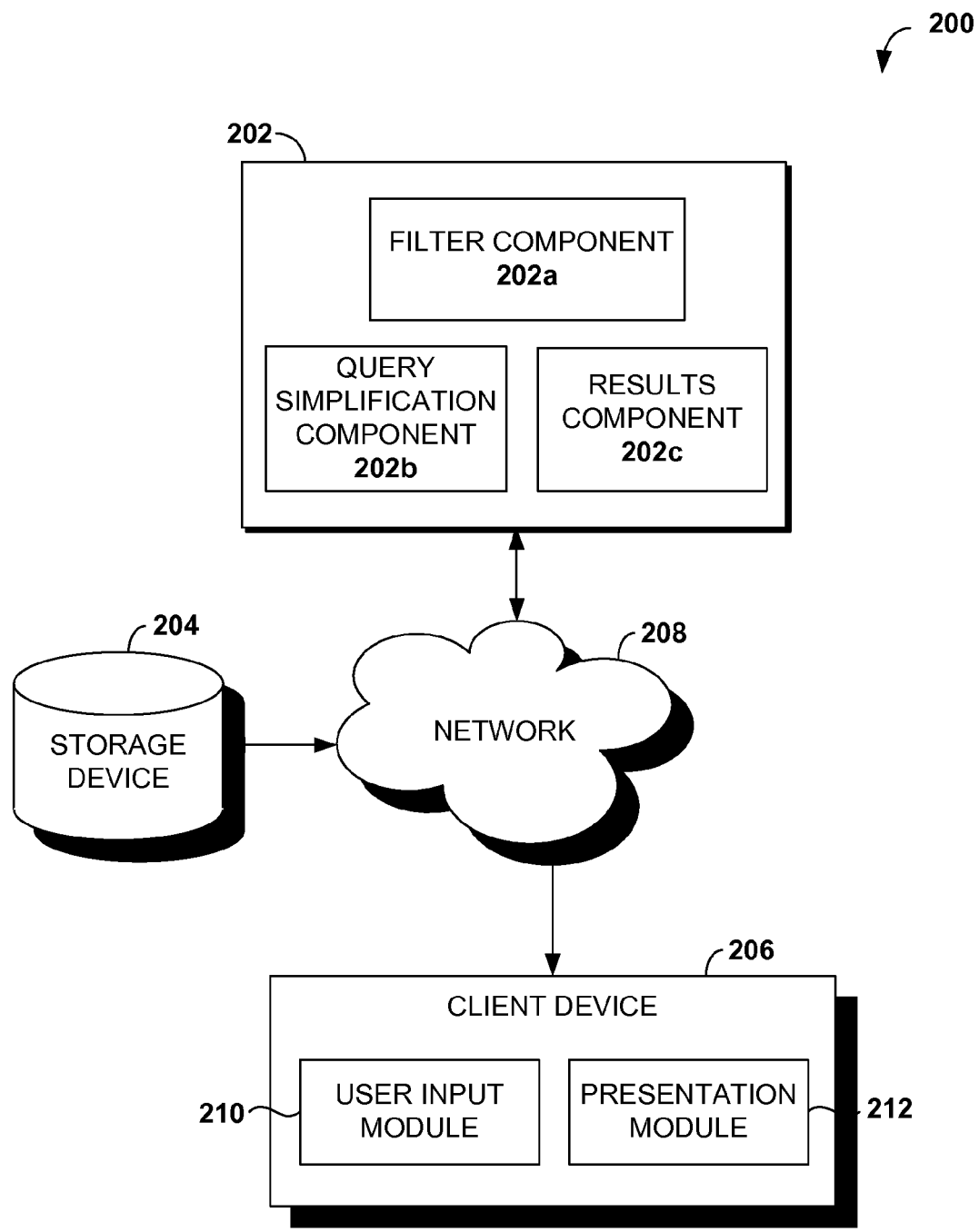
FIG. 2 is a component diagram illustrating an exemplary computing system that simplifies queries, in accordance with embodiments of the invention.

FIG. 2 is a component diagram illustrating an exemplary computing system 200 that simplifies queries, in accordance with embodiments of the invention. The computing system architecture 200 includes, among other things, servers 202, storage device 204, client device 206, and network 208. It is understood and appreciated by those of ordinary skill in the art that the computing system architecture 200 shown in FIG. 2 is merely an example of one suitable computing system and is not intended to suggest any limitation as to the scope of use or functionality of the embodiments of the invention. Neither should the computing system architecture 200 be interpreted as having any dependency or requirement related to any single module/component or combination of modules/components illustrated therein.

The servers 202, storage device 204, and client device 206 are connected to each other and in communication with one another via a network 208. The network 208 may include, without limitation, one or more local area networks (LANs) and/or wide area networks (WANs). Such networking environments are commonplace in offices, enterprise-wide computer networks, intranets and the Internet.

Each of the servers 202 and the client device 206 shown in FIG. 2 may be any type of computing device, such as, for example, computing device 100 described above with reference to FIG. 1. By way of example only and not limitation, each of the servers 202 and the client device 206 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

The servers 202 may include any type of application server, database server, or file server configurable to perform the methods described herein. In addition, a server 202 may be a dedicated or shared server. One example, without limitation, of a server that is configurable to operate as server 202 is a structured query language ("SQL") server executing server software such as SQL Server 2012, which was developed by the Microsoft Corporation headquartered in Redmond, Wash.

The server 202 may implement a search engine having a filter component 202a, query simplification component 202b, and results component 202c. The search engine is configured to provide a search engine results page (SERP) in response to a query. The search engine may provide a query formulation interface where a user may enter a query. In turn, the search engine receives the partial string as the user interacts with the client device 206.

The filter component 202a may detect that a query is a candidate for simplification. A query may be a candidate for simplification when the query is long or hard. The filter component 202a may identify the query as long or hard based on, among other things, the number of terms included in the query. When the number of terms is greater than a specific threshold (e.g., 4) the query may be identified as long or hard.

In certain embodiments, the query may be identified as long or hard and a candidate for simplification based on the frequencies or ranks associated with similar prior queries included in the search engine log. The filter component 202a may access the search engine log to identify one or more prior queries matching the query provided by the client device 206. The filter component 202a may retrieve a frequency associated with the query. The frequency may indicate the number of times searchers having issued the query to the search engine. When the frequency of the matching prior query is below a specific number (e.g., 10), the filter component 202a may identify the query as long or hard and a candidate for simplification. In other embodiments, the ranks for prior queries similar to the issued query may be obtained. If the prior ranks are below a predetermined threshold (e.g., 50% percent relevant), the query may be identified as a candidate for simplification. Accordingly, the frequency or rank may allow the filter component 202a to detect the query as long or hard and a candidate for simplification before the query is issued to the search engine. In other embodiments, metrics for prior matching queries like number of advertisements per SERP, or number of results per SERP, may be used to identify when query simplification is needed for a similar issued query. The thresholds for these metrics may be averages (e.g., average number of advertisements per page, average number of results per page) stored in the search engine log.

In an alternate embodiment, the filter component 202a may detect a query as long or hard after the query is issued based on the ranks assigned to the results of the issued query. The filter component 202a may obtain the ranks or URIs associated with the prior queries stored in the search engine log. Based on the prior ranks, the filter component 202a may generate a regression model. The regression model may identify a range of expected ranks returned by the search engine for prior queries. In turn, the filer component 202a may retrieve the ranks for the issued query and determine whether the ranks for the issued query are consistent with the regression model. For instance, if the assigned ranks of URIs associated with the issued query are below an expected rank or range of expected ranks, the filter component 202a may identify the query as long or hard and a candidate for simplification.

The query simplification component 202b may generate subqueries by dropping terms in a query received at the search engine. The query simplification component 202b obtains queries from the filter component 202a. The filter component 202a transmits the issued queries identified as long or hard and candidates for simplification to the query simplification component 202b for further processing. The query simplification 202b receives the queries and simplifies them by dropping terms. In some embodiments, the query simplification component 202b may identify terms that should be kept and terms that should be dropped. The query simplification component 202b may identify terms to drop and keep based on prior search queries and prior searcher behavior during search sessions in the search engine log. Statistical models like machine translation, condition random fields, and max entropy may be generated using the search engine log. In turn, the query simplification component 202b may utilize the statistical models to select the best terms to keep and drop. In turn, the query simplification component 202b may generate subqueries derived from the issued query. The subqueries are processed by the search engine to obtain search results.

The results component 202c may obtain the search results for the subqueries. The query completion component 202b provides the generated subqueries to the results component 202c. The results component 202c, in at least one embodiment, merges the search results for the subqueries. The merged results are highlighted and ranked by the result component 202c. The search results may be ranked based on, among other things, all terms included in the original query. In turn, the ranked, merged results are transmitted to the client device 206 for display. In at least one embodiment, corresponding results in merged results may include highlights of the terms included in the subquery that surfaced the result. In other words, the highlighted terms for the results may correspond to the terms of subquery that surfaced the result in the index. Accordingly, the results component 202c provides the search result for a long or hard query to the client device 206.

In other embodiments, the results component 202c may assign ranks based on any of the following conditions: dwell times corresponding to one or more URIs in the search results above a specific threshold (e.g., 30 seconds), whether the number of clicks on other URIs during prior search sessions having the URI is below a specific threshold (e.g., 5 clicks), and whether the timestamps for the previous URIs are within a threshold time period (one week) of when the search engine received the issued query. For each of the above conditions that is satisfied, the corresponding URI rank may be incremented by a predetermined value (e.g., 1 or another weighted value that is dependent on an importance of the condition).

The storage device 204 may store the search engine logs. In some embodiments, the log includes previous queries issued by a community of users or URIs interacted with by the community of users. The log may also include, among other things, timestamps for when the query was issued, navigation history corresponding to the query, SERPs associated with one or more of the previous queries, dwell times for URIs included in the SERP, number of clicks for each URI within a prior session corresponding to the query, prior ranks assigned to URIs, or number of visits to each URI within the prior session. The storage device 204 may provide the filter component 202a, query simplification component 202b, and results component 202c access to the log.

Additional components of the servers 202 (not shown for clarity) may include, without limitation, a processing unit, internal system memory, and a suitable system bus for coupling various system components, including one or more databases for storing information (e.g., files and metadata associated therewith). Each server typically includes, or has access to, a variety of computer-readable media. By way of example, and not limitation, computer-readable media may include computer-storage media and communication media. In general, communication media enables each server to exchange data via a network (e.g., network 208). More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system architecture 200 is merely exemplary. While the server 202 is illustrated as a single unit, one skilled in the art will appreciate that the cloud servers 202 are scalable. For example, the server 202 may in actuality include a plurality of servers in communication with one another. Moreover, the storage device 204 may be included within the cloud servers 202 or client device 206 as a computer-storage medium. The single unit depictions are meant for clarity, not to limit the scope of embodiments in any form.

The storage device 204 is configured to store, among other things, search engine histories and user histories when authorization is received from the user. The storage device 204 is accessible by the servers 202. In various embodiments, such information may include, without limitation, text, images, audios, information associated therewith, and the like, in association with various languages. In embodiments, the storage device 204 is configured to be searchable for one or more of the items stored in association therewith. It will be understood and appreciated by those of ordinary skill in the art that the information stored in association with the storage device 204 may be configurable and may include any information relevant to one or more applications. The content and volume of such information are not intended to limit the scope of embodiments of the invention. Further, though illustrated as a single, independent component, the storage device 204 may, in fact, be a plurality of storage devices, for instance a database cluster, portions of which may reside on the server 202, the client device 206, another external computing device (not shown), and/or any combination thereof.

As shown in FIG. 2, the client device 206 includes a user input module 210 and a presentation module 212. The client device 206 executes one or more applications, which may include search interfaces. The one or more applications are interacted with via the user-input module 210 and application content is rendered via the presentation module 212. In one embodiment, the applications may be games, word processing files, e-books, etc. The user may interact with the applications and may issue queries that are preformed locally on the content of the client device 206 or the server 202. The client device may store the user history. The user history stored on the client device may include, among other things, searches performed for applications, within applications, and corresponding navigations to the applications or to content corresponding to the applications. When authorized by the user, the client device may share the locally stored user history with the server 202.

In some embodiments, one or both of the modules 210 and 212 may be implemented as stand-alone applications. These stand-alone applications may be downloaded from the cloud server 202. In other embodiments, one or both of the modules 210 and 212 may be integrated directly into the operating system of the client device 206. It will be understood by those of ordinary skill in the art that the modules 210 and 212 illustrated in FIG. 2 are exemplary in nature and in number and should not be construed as limiting. Any number of modules may be employed to achieve the desired functionality within the scope of embodiments hereof.

The user input module 210 is configured for receiving input. Typically, input is received via a user interface (not shown) associated with the client device 206 or the like. Upon receiving input, the presentation module 212 of the client device 206 is configured for presenting results, potential completions, and the partial strings. Embodiments are not intended to be limited to visual display but rather may also include audio presentation, combined audio/video presentation, and the like.

In one embodiment, a client device 206 is configured to present a search interface to the user. The user interacts with the search interface to enter a partial string. The partial string is displayed by the client device 206. In turn, the client device 206 receives potential completions for the partial string. The potential completions may be presented in a dropdown box associated with the search interface.

In certain embodiments, the computer system may execute several queries in parallel at one or more search engines. The computer system may generate several subqueries when the computer system identifies the queries as a long or hard query that is a candidate for simplification. The search results for the subqueries are received and merged for transmission to the user. In one embodiment, search results for the original query are obtained and compared to the merged results. The computer system, based on URI satisfaction metrics included in the log, selects between the search results of the original query and merged results for the subqueries.

Figure 3:
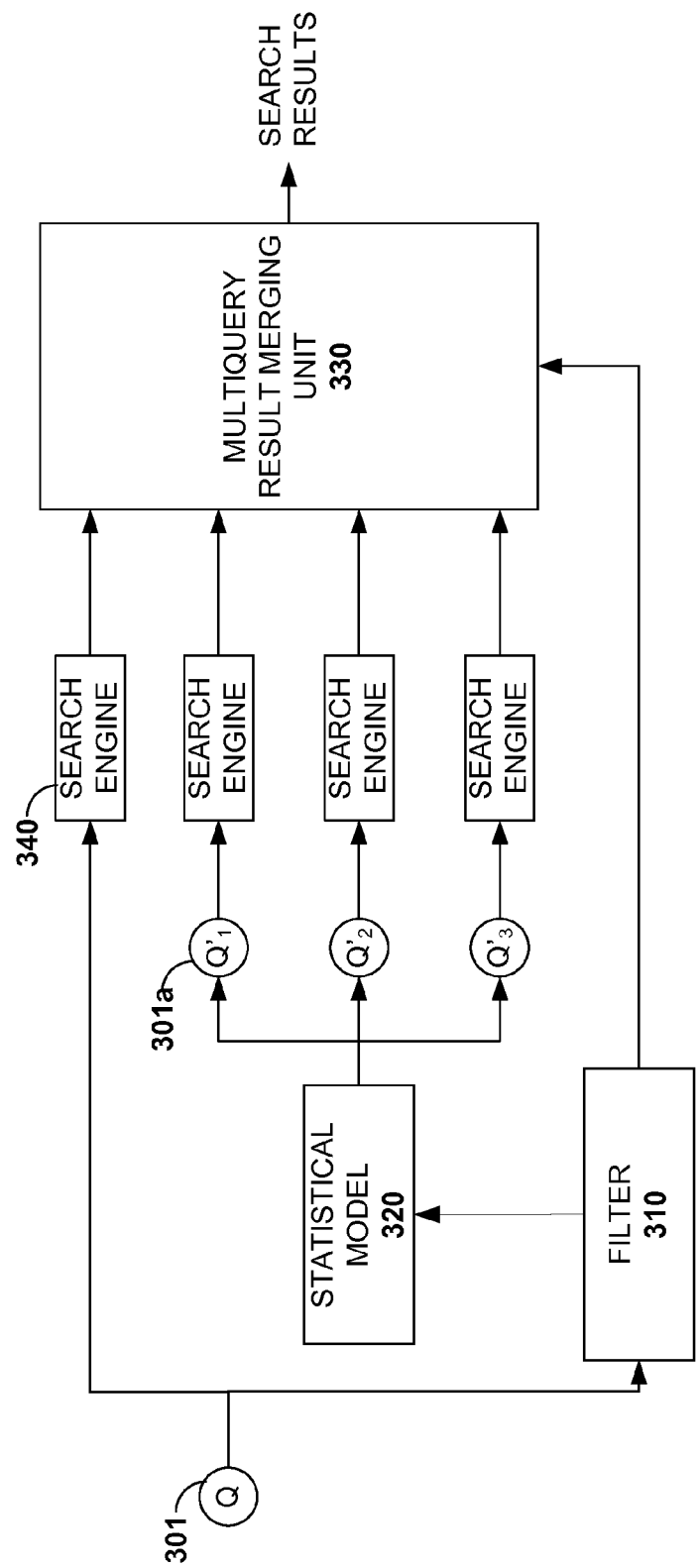
FIG. 3 is a block diagram illustrating an exemplary computing system for processing long or hard queries, in accordance with embodiments of the invention.

FIG. 3 is a block diagram illustrating an exemplary computing system 300 for processing long or hard queries, in accordance with embodiments of the invention. The computing system 300 is configured to receive a query 301 that may be processed by a filter 310, statistical model 320, and search engine 340 to obtain search results that may be further processed by the multiquery merging unit 330 to select search results for transmission to a user.

The query 301 is received by the computer system. In one embodiment, the query is processed by the search engine 340 to obtain search results. These search results may represent a baseline for determining whether additional results with better satisfaction metrics (e.g., dwell time, number of advertising, number of results per page, relevance) may be obtained with query simplification. As the search engine is obtaining results for the query, the query may be transmitted to a filter 310.

The filter 310 determines whether the query is long or hard and a candidate for simplification. The filter 310 may identify the query as long or hard, when the number of phrases in the query is above a specified number (e.g., 4). The filter 310 may also obtain logs having prior queries and corresponding metrics, like rank, frequency, visits, abandonment rate, etc. to determine whether the query is a candidate for simplification. The logs may be based on the search engine history for the previous 12 months.

The filter 310 may identify a query as a candidate for simplification when matching prior queries having low frequencies. The filter 310 ignores "head" queries having high frequencies (e.g., high frequency queries are "head" and low frequency queries are "tail") and addresses the "tail" queries. In one embodiment, a query having matching prior tail queries in the log is selected as a candidate for simplification. In other embodiments, additional metrics may be utilized.

For instance, ranks, relevance, number of results, or any other satisfaction metric may be used to identify queries for simplification. In some embodiments, the threshold used for a metric may be 90% of the average. As an example, the average frequency found in the log may be 40. The threshold for the frequency metric may be 36. Thus an issued query having prior matching queries with a frequency lower than the threshold (e.g., 36) may be selected as candidate for simplification.

In alternate embodiments, an issued query may be identified for simplification after the search results are obtained for the issued query as opposed to before the search engine obtains the search results. The ranks, relevance, number of results per page, and number of ads per page for the issued query may be used to determine whether a regression model associated with the log expects the values for the metrics of the issued query. When the values are outside a range (e.g., lower than the expected values) of the regression model, the issued query may be selected for simplification. The regression based post-search analysis may reduce runtime impact to head queries (if current metric values of the issued query are lager than a threshold established by regression model score, the issued query is not selected as a candidate for simplification). This may reduce the processing delays for head queries. Accordingly, the filter 310 may utilize several metrics to detect potential over-specification in an issued query. The filter 310 may employ pre-search analysis or post-search analysis to identify an issued query that is a candidate for simplification.

After the filter 310 identifies a long or hard query as a candidate for simplification, the statistical model 320 may receive the query and select terms of the issued query that should be dropped and terms that should be kept. The statistical models 320 are trained using logs from the search engine that include user behaviors and queries. The logs include, among other things, the number of query reformulations during a search session, the various prior queries that are used, and the change in relevance in URIs included in search results during the search session. The logs may include click data for URIs in the search result corresponding to prior queries, similar queries (e.g. queries sharing similar click distributions but one is the substring of the other queries or typographical error of the other queries), user behaviors (e.g., dwell time, gaze time, abandonment rate), session-log data (e.g., user issued a long or hard query at first without click and then followed by a shortened query in a same session which resulted in some clicks), title-query pairs (e.g., prior queries are matched to titles associated with the URIs that are included in search results for the prior queries). In an embodiment, the titles of the URI are selected from the URIs that the prior users clicked on or URIs having a dwell time greater than 30 seconds. The title-query pairs may simulate long-to-short or hard-to-simple query translation when the prior query is less than a predetermine size (e.g., four phrases).

Based on the search logs, the statistical model 320 may identify the words of a long or hard query that should be dropped. In some embodiments, the statistical model 320 may implement machine translation, condition random fields, or max entropy to identify the words to drop. A set of sub queries may be generated of the statistical model 320.

The statistical model 320 may select terms to drop based on machine translation that accesses the title-query pairs. The title (e.g., greater than four words) and short queries (e.g., less than four words) may simulate query simplification behavior. The statistical model 320 may identify titles that are similar to the long or hard query identified as a candidate for simplification. In one embodiment, of the titles that are similar to the long or hard query, the statistical model 320 may further select titles based on click frequency and other user interaction behaviors (e.g., dwell time, hover, gaze, etc). The queries of the corresponding titles selected by the statistical model 320 in the title-query pairs may be identified as simplified queries ($Q'_1$) by the statistical model 320. The simplified queries may drop more than one (including all) terms of the issued long or hard query in favor of the one or more simplified queries generated by the statistical model 320.

In another embodiment, the statistical model 320 may select terms to drop based on condition random fields. The condition random field may obtain the long or hard query and identify one or more terms that should be kept or dropped. The condition random field may be trained based on the prior queries and the user behaviors included in the logs. Condition random field may consider user interaction in search histories (e.g., search frequencies for prior queries, prior search sessions having time ordered prior queries, and user reformulation of the prior queries until satisfactory results are interacted with by the user). Based on this type of interaction, the conditions random field is able to generate a model of the terms that should be kept or dropped when interacting with the search engine. The long or hard query may be assigned a series of ordered labels (each is either "keep" or "drop") to each term. The statistical model 320 may retrieve the labels for the terms and generate a set of simplified queries ($Q'_2$) that drop one or more of the terms labeled "drop." For instance, a long or hard query with three terms identified as "drop" terms may be simplified to at least three simplified queries, with a first query missing one labeled "drop" term, a second query missing two labeled "drop" terms, and a third query missing three labeled "drop" terms.

In still other embodiments, the statistical model 320 may select terms to drop based on maximum entropy. The maximum entropy classifier may obtain the long or hard query and identify one or more terms that should be kept or dropped. The maximum entropy classifier may be trained based on the prior queries and the user behaviors included in the logs. The maximum entropy classifier identifies words to keep and drop based on the context of the word in a long or hard query. The maximum entropy classifier may consider word context in search histories (e.g., search frequencies for prior queries with similar words in context (e.g., word position placement within the query, part of speech, spelling, or abbreviation)) and user reformulation of the prior queries until satisfactory results are interacted with by the user. Based on this type of interaction, the maximum entropy classifier is able to generate a model of the terms that should be kept or dropped when interacting with the search engine. The long or hard query may be assigned a series of ordered labels (each is either "keep" or "drop") to each term. The statistical model 320 may retrieve the labels for the terms and generate a set of simplified queries ($Q'_3$) that drop one or more of the terms labeled "drop." For instance, a long or hard query with three terms identified as "drop" terms may be simplified to at least three simplified queries, with a first query missing one labeled "drop" term, a second query missing two labeled "drop" terms, and a third query missing three labeled "drop" terms.

Accordingly, the statistical model 320 may generate at least three sets of simplified queries. In turn, each set of queries may be issued in parallel to the search engine. In one embodiment, the simplified queries may be issued to the search engine along with the long or hard query selected for simplification. The search engine processes the simplified queries and the long or hard query and provides search results. The search results for the simplified queries are merged and configured for presentation to the user via the multiquery result merging unit 330.

The multiquery result merging unit 330 module may merge the results from the simplified queries and select the final best (e.g., usually top 10) search results to show in a SERP. The URIs selected may be based on, among other things, prior satisfaction metrics for the URIs and current relevance metrics or ranking metrics in the search engine. The ranks or relevance metrics for the simplified queries may consider all terms included in the long or hard query. In an embodiment, the multiquery result merging unit 330 may select between the merged results of the simplified queries and the search results for the long or hard query using the satisfaction metrics. In an alternate embodiment, the multiquery result merging unit 330 may combine the results of the long or hard query and results of the simplified queries. In turn, the search results are ordered based on, among other things, rank, relevance, or satisfaction metrics. In turn, the selected results may be transmitted to the user for display.

In other embodiments, the search engine executes a query simplification process on certain queries received by a user of a client device. The query may be classified as a long or hard query that is a candidate for simplification. In turn, the search engine may generate subqueries based on statistical models and the logs of the search engine. The search engine ranks and configures the search results for display to the user based on satisfaction metrics.

Figure 4:
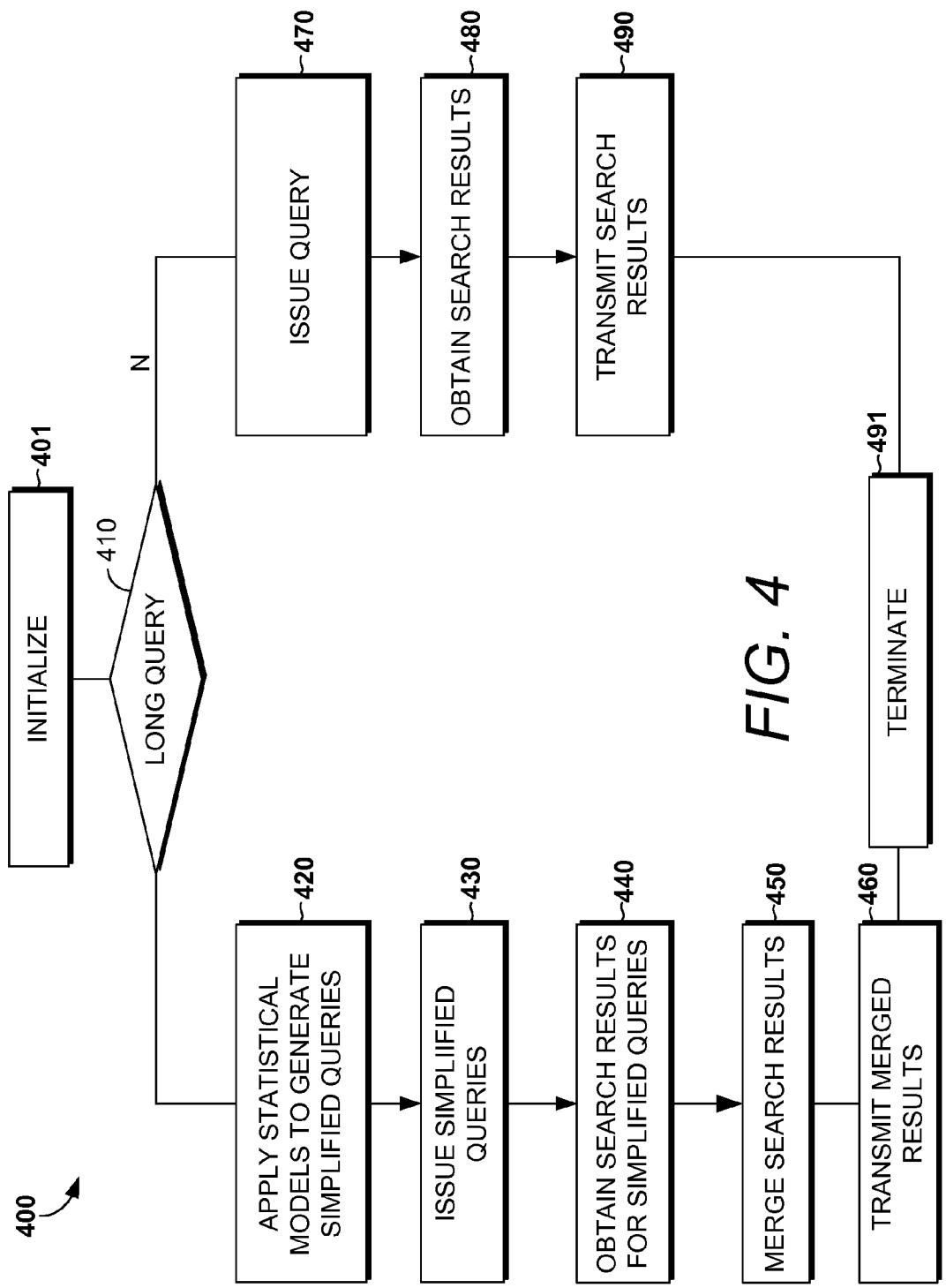
FIG. 4 is a logic diagram illustrating an exemplary method for processing long or hard queries, in accordance with embodiments of the invention.

FIG. 4 is a logic diagram illustrating an exemplary method 400 for processing long or hard queries, in accordance with embodiments of the invention. In step 401, the method is initialized by one or more search engines. In step 410, the one or more search engines may determine whether a query received at the search interface is long or hard. Long or hard queries may be candidates of simplification based on logs maintained by the one or more search engines. To identify long or hard queries that are candidates for simplification, the search engine may retrieve search engine frequency logs for previous queries. Based on the frequency logs, the search engine may identify previous queries matching the received query. When the frequency corresponding to the matching previous queries are below a specified frequency (e.g., 20 or an average frequency metric for the log), the search engine identifies the received query as long or hard and requiring simplification. In an alternate embodiment, the search may identify a candidate for simplification based on ranks. For instance, the search engine may identify a regression model for the rank distribution for URIs corresponding to previous queries in a search engine log. In turn, ranks for URIs included in current search results for the received query are obtained by the search engine. The search engine based on the regression model and ranks for the URIs may identify the query as long or hard and a candidate for simplification if the ranks for the URIs are lower than an expected rank in view of the regression model for the rank distribution of prior queries in the search engine log.

When the query is long or hard, the one or more search engines are configured to perform the following steps. In step 420, the one or more search engines may apply one or more statistical models to the query to generate simplified queries. The statistical models may be based on log data that includes prior queries, click distributions, and dwell times. In one embodiment, the statistical models are selected from one of: machine translation, max-entropy, or condition random fields. In turn, the one or more search engines, in step 430, may issue the one or more simplified queries to one or more search engines. In certain embodiments, the simplified queries drop one more of the terms included in the received query.

In step 440, the one or more search engines may obtain search results for the one or more simplified queries from the one or more search engines. In step 450, the one or more search engines may merge the search results for the one or more simplified queries. The merged search results are transmitted from the search engine to a user for display, in step 460.

When the query is not long or hard, the one or more search engine may perform the following steps. In step 470, the query is issued to at least one search engine. In turn, the search engine, in step 480 obtains search results for the query. The search results, in step 490, are transmitted from the search engine to a user for display. The method terminates in step 491.

In other embodiments, query simplification is provided by a search engine, which merges results and ranks the results based on log metrics. The search engine merges URIs based on, among other things, prior satisfaction metrics. The search engine transmits the merged and ranked results to the user for display on the client device. In some embodiments, one or more URIs in the search results may include highlights that correspond to terms of the simplified queries that surfaced the URI.

Figure 5:
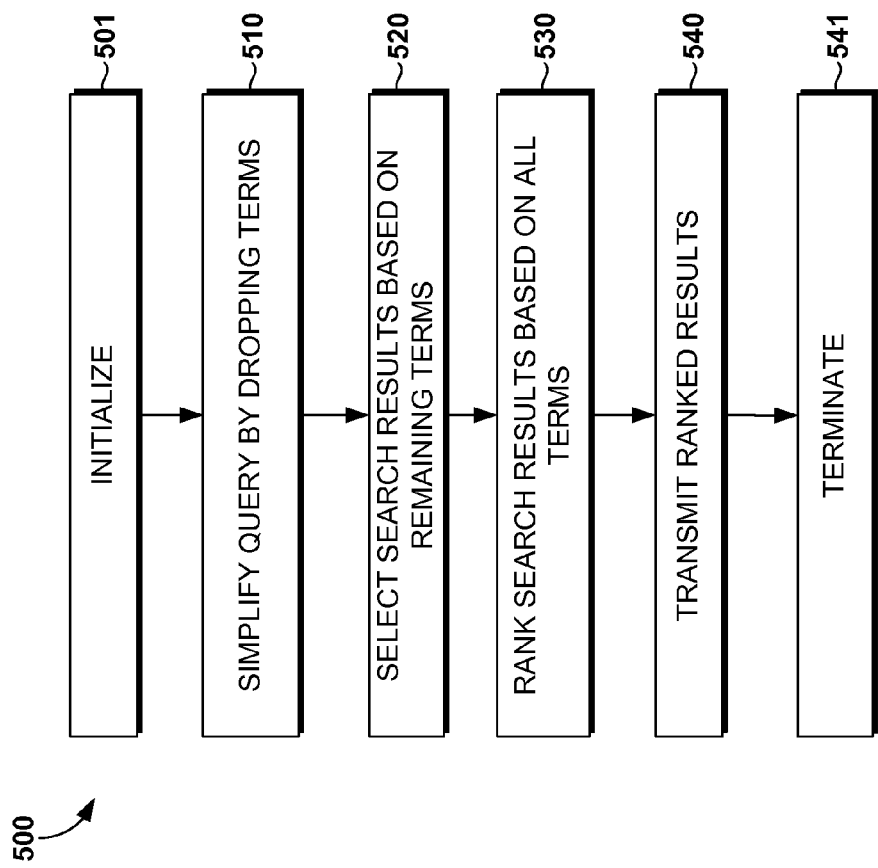
FIG. 5 is a logic diagram illustrating an exemplary method for simplifying queries, in accordance with embodiments of the invention.

FIG. 5 is a logic diagram illustrating an exemplary method 500 for simplifying queries, in accordance with embodiments of the invention. The method initializes in step 501. In step 510, the search engine simplifies a query received at a search engine by dropping one or more terms. In one embodiment, the received query is simplified based on a search log maintained by the search engine. For instance, the query is simplified based on statistical models that are trained with the search log. In certain embodiments, the received query is simplified by partitioning the query into two or more subqueries that are executed in parallel by the search engine.

The search engine selects search results based on the terms that remain excluding the terms that are dropped, in step 520. The search results obtained by the search engine may relate to two or more subqueries derived from the received query. In turn, the search engine may merge the search results for the two or more subqueries. In other embodiments, the search engine obtains search results for the received query in parallel with search results for two or more simplified queries.

In some embodiments, the search engine may compare the search results for the query and merged search results of the subqueries. Then the search engine selects between the search results of the original query and the merged search results based on, among other things, the number of URIs in the search results and the merged search results. In some embodiments, the number of URIs for the first SERP may be considered by the search engine to determine whether to select the merged results or the search engine results. In an alternate embodiment, the search engine may select between the search results of the original query and the merged search results based on satisfaction metrics associated with the URIs included in the search results and URIs included in the merged search results.

The merged results may be ranked, in step 530, with all of the terms of the query including the dropped terms. In step 540, the search engine transmits the ranked results for display to a user that provided the query. The ranked results may include highlights for the terms of the simplified query if the merged results are selected. The ranked search results, however, may not include highlights for the dropped terms if the merged results are selected. The method terminates in step 541.

In summary, the search engine is configured to simplify long or hard queries. For example, the search engine may receive a query for "nibbana restaurant official website." Because the search engine may identify this received query as a long or hard query and a candidate for simplification, the query may be simplified by the search engine. In one case, the search engine may drop the terms "official" and "website" based on the statistical models trained on the search engine logs. So, the search engine may simplify the query to "nibbana" and "restaurant." The search engine receives the results for the simplified query. The search results may be ranked for display to the user. In one embodiment, the dropped terms may be processed by the search engine as rankonly terms (e.g., "rankonly: official" and "rankonly: website"). Accordingly, the ranked search results are transmitted to the user for display.

In certain embodiments, the search engine may include filter, query simplification, and ranking components that simplify the queries and obtain appropriate search results. The filter component may be configured to determine whether query simplification is needed for the queries received by the search engine. The filter component, in an embodiment, may be configured to select the query for simplification based on at least one of the following: a number of terms in the query and a frequency for prior similar queries included in the search engine log.

The query simplification component is configured to obtain the received queries from the filter component when the filter component selects the query for simplification. In some embodiments, during simplification, the query simplification component drops one or more terms of the received queries based on a search engine log. The query simplification component executes at least one statistical model selected from the following: a machine translation model, condition random field model, or max entropy model to simplify the query. In one embodiment, each model provides a set of simplified queries that are issued in parallel to the search engine. The query simplification component may be further configured to issue multiple simplified queries to the search engine. In some instances, the query simplification component may store the query and the corresponding simplified queries for subsequent use by the search engine when a similar query is received by the search engine.

The result component is configured to obtain the search results for the one or more queries generated by the query simplification component. In one embodiment, the result component is configured to combine the search results for the one or more simplified queries. In turn, the search results are ranked by the result component for display based on each term included in the query, including the terms that are dropped. The search results may be transmitted by the result component to the ranked results for display to a user.

Accordingly, long or hard queries are identified as candidates for simplification, according to embodiments of the invention. A query log having frequencies for previous queries may be used to determine whether the query received at the search engine is a "tail" query (e.g., low frequency query). The low frequency may be an indication that the received query is a hard query. Furthermore, a length filter may filter short received queries based on a length threshold (e.g., here a condition for identifying a received query as long may be when the query length is >=3 words). These frequency and length filters may be applied, in some embodiments, upon receiving the query but before processing the query to gather search results for a SERP.

In addition to frequency and length filters, a regression-model filter may be applied after obtaining results for the long or hard query and results for the one or more simplified queries, in certain embodiments. The ranked results for the long or hard queries may be compared to one or more ranks generated based on regression-model filter. When the ranks assigned to the results for the long or hard queries are consistent with the expected ranks from the regression model, the query is not hard or long and the results of the long or hard queries are returned to the user. However, when the ranks assigned to the results for the long or hard queries are not consistent with the expected ranks from the regression model, the query is hard or long and results for the one or more simplified queries are returned to the user.

It will be understood by those of ordinary skill in the art that the order of steps explained above are not meant to limit the scope of the embodiments of invention in any way and, in fact, the steps may occur in a variety of different sequences within embodiments hereof. Any and all such variations, and any combination thereof, are contemplated to be within the scope of embodiments of the invention. Alternative embodiments will become apparent to those of ordinary skill in the art to which embodiments of the invention pertains without departing from its scope. Embodiments of the invention have been described to be illustrative rather than restrictive.

From the foregoing, this innovation is one well adapted to attain all the ends and objects set forth above, together with other advantages that are obvious and inherent to the system and method. It should be understood that certain features and subcombinations are of utility and may be employed without reference to other features and subcombinations. This is contemplated by and is within the scope of the claims.

The technology claimed is:

1. One or more computer storage media having computer-executable instructions embodied thereon that when executed by a computing device perform a query simplification, the instructions configured to:
    determine whether a query received at the search interface is a candidate for simplification based on a frequency or rank associated with similar prior queries in a search engine frequency log, the determining comprising:
    identifying a regression model for a rank distribution for Uniform Resource Identifiers (URIs) corresponding to previous queries in the search engine frequency log;
    obtaining ranks for URIs for the query; and
    identifying the query as a candidate for simplification when the ranks for the URIs are lower than an expected rank in view of the regression model for the rank distribution;
    apply one or more statistical models to the query to generate simplified queries, the one or more statistical models being at least one of machine translation accessing title-query pairs, the title-query pairs corresponding to prior queries matched to titles associated with URIs that are included in search results for the prior queries, maximum entropy, or condition random fields;
    issue the one or more simplified queries to one or more search engines,
    obtain search results for the one or more simplified queries from the one or more search engines,
    merge the search results for the one or more simplified queries, and
    transmit the merged results to a user for display.

2. The computer storage media of claim 1, wherein the determining further comprises:
    retrieving the search engine frequency log for previous queries;
    identifying previous queries matching the query; and
    when the frequency corresponding to the matching previous queries is below the specified frequency, identifying the query as a candidate for simplification.

3. The computer storage media of claim 1, wherein the simplified queries drop one or more terms included in the query.

4. The computer storage media of claim 1, wherein the statistical models are based on log data that includes one or more of prior queries, click distributions, or dwell times.

5. The computer storage media of claim 1, wherein the simplifying comprises, based on search logs, identifying the one or more terms to drop by implementing machine translation, condition random fields, or max entropy.

6. The computer storage media of claim 1, wherein the condition random field is trained based on the prior queries and user behaviors included in the search engine frequency log.

7. A computer implemented method for identifying results for a query, the method comprising:
determining whether a query received at a search engine is a candidate for simplification based on a frequency or rank associated with similar prior queries in a search engine frequency log, the determining comprising:
retrieving the search engine frequency log for prior queries;
identifying prior queries matching the query; and
when a frequency corresponding to the matching prior queries is below the specified frequency, identifying the query as a candidate for simplification;
simplifying the query by dropping one or more terms to partition the query into two or more subqueries, the dropped one or more terms being determined based on one or more statistical models, the one or more statistical models being at least one of machine translation accessing title-query pairs, the title-query pairs corresponding to prior queries matched to titles associated with URIs that are included in search results for the prior queries, maximum entropy, or condition random fields;
obtaining search results for the two or more subqueries;
merging the search results for the two or more subqueries;
selecting search results based on the terms that remain excluding the terms that are dropped;
ranking the search results using all of the terms of the query including the dropped terms; and
transmitting the ranked results for display to a user.

8. The method of claim 7, wherein the query is simplified based on a search log maintained by the search engine.

9. The method of claim 8, wherein the query is simplified based on statistical models that are trained with the search log.

10. The method of claim 7, further comprising:
obtaining search results for the query; and
comparing the search results for the query and merged search results of the subqueries.

11. The method of claim 10, further comprising:
selecting between the search results for the query and the merged search results of the subqueries based on a number of URIs in the search results and the merged search results.

12. The method of claim 10, further comprising:
selecting between the search results for the query and the merged search results of the subqueries based on a satisfaction associated with the URIs included that are included in the search results and URIs included in the merged search results.

13. The method of claim 7, wherein the search results include highlights for the terms of the simplified query.

14. The method of claim 13, wherein the search results do not include highlights for the dropped one or more terms.

15. The method of claim 7, wherein the determining further comprises identifying a query in need of simplification by evaluating preliminary search results for the query.

16. The method of claim 15, wherein evaluating preliminary search results for the query comprises evaluating at least one of the ranks, relevance, number of results per page, or number of ads per page for the search results for the query.

17. A computer system for query simplification, the system comprising a search engine configured to receive queries and provide search results in response to the queries, the search engine implementing the following:
a filter component that determines whether query simplification is needed for the received queries based on a frequency or rank associated with similar prior queries in a search engine log, the determining comprising:
identifying a regression model for a rank distribution for Uniform Resource Identifiers (URIs) corresponding to previous queries in the search engine log;
obtaining ranks for URIs for the received queries; and
identifying the received queries as a candidate for simplification when the ranks for the URIs are lower than an expected rank in view of the regression model for the rank distribution;
a query simplification component that obtains the received queries from the filter component when the filter component selects the query for simplification, identifies one or more terms to drop by implementing at least one of machine translation accessing title-query pairs, the title-query pairs corresponding to prior queries matched to titles associated with URIs that are included in search results for the prior queries, condition random fields, or max entropy; drops the one or more terms of the received queries based on the search engine log and issues multiple simplified queries to the search engine; and
a result component that obtains and combines the search results for the one or more simplified queries generated by the query simplification component based on prior satisfaction metrics for the results and current relevance metrics in the search engine.

18. The system of claim 17,
wherein the query simplification component further issues multiple simplified queries to the search engine,
and wherein the result component receives the search results for the one or more simplified queries, combines the search results for the one or more simplified queries, ranks the search results for display based on each term included in the query including the terms that are dropped, and transmits the ranked results for display to a user.

19. The system of claim 17, wherein the filter component further selects a query for simplification based on at least one of the following: a number of terms in the query or a frequency for prior similar queries included in the search engine log.

20. The system of claim 17,
wherein the query simplification component executes at least one statistical model selected from the following: a machine translation model, condition random field model, or max entropy model to simplify the query, such that each model provides a set of simplified queries that are issued in parallel to the search engine,
and wherein the query simplification component stores the query and the corresponding simplified queries for subsequent use by the search engine when a similar query is received by the search engine.

* * * * *